United States Patent [19]

Spinelli

[11] Patent Number: 4,484,810

[45] Date of Patent: Nov. 27, 1984

[54] MOVING PLATEN PRECESSION SYSTEM

[75] Inventor: Richard A. Spinelli, Rochester, N.Y.

[73] Assignee: Xerox Corporation, Stamford, Conn.

[21] Appl. No.: 496,373

[22] Filed: May 20, 1983

[51] Int. Cl.³ ............................................. G03G 15/28
[52] U.S. Cl. ...................................... 355/8; 355/3 BE
[58] Field of Search .................. 355/8, 3 BE, 16, 3 R

[56] References Cited

U.S. PATENT DOCUMENTS

| | | | |
|---|---|---|---|
| 3,454,335 | 7/1969 | Caldwell et al. | 355/8 |
| 3,650,621 | 3/1972 | Lewis et al. | 355/8 |
| 3,754,822 | 8/1973 | Melrose | 355/8 |
| 4,232,960 | 11/1980 | Glab | 355/8 |
| 4,285,590 | 8/1981 | Silverberg | 355/8 |
| 4,336,995 | 6/1982 | Durbin et al. | 355/8 |
| 4,351,605 | 9/1982 | Carpenter et al. | 355/8 |
| 4,362,382 | 12/1982 | Simpson | 355/8 X |
| 4,372,670 | 2/1983 | Carpenter et al. | 355/8 |
| 4,415,258 | 11/1983 | Rees et al. | 355/8 |

*Primary Examiner*—R. L. Moses

[57] ABSTRACT

The present invention is directed to a precession scanning system wherein a platen moving in a first direction is scanned by a scan illumination assembly and lens moving in the opposite direction. The projected image is precessed onto a moving photoreceptor belt in a direction opposite the belt motion. The velocity relationship between platen, lens, scan illumination assembly and photoreceptor, as well as scan distance, are governed by a unique set of relationships.

2 Claims, 2 Drawing Figures

MOVING PLATEN PRECESSION SYSTEM

BACKGROUND AND PRIOR ART STATEMENT

This invention relates generally to a document reproduction system and, more particularly to an optical system in which a document on a document platen is moved along an object plane through an exposure zone and a reflected image is projected onto a moving flat photoreceptor at a rate faster than the rate of movement of the photoreceptor and in the direction opposite such photoreceptor movement.

Precession scan systems which expose images on a photoreceptor at a faster rate than the photoreceptor movement are known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed, (i.e. moved in a direction opposite to the drum motion) onto the drum surface by means of a slit aperture which moves in a direction opposite that of the drum. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in U.S. Pat. No. 4,232,960 (Glab) assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan document on a curved platen onto the drum.

Precession onto a flat photoreceptor surface introduces different problems requiring a different set of solutions. U.S. Pat. No. 3,754,822 (Melrose) also assigned to the same assignee as the present invention, discloses a scan system wherein a platen and flat photoreceptor move synchronously in the same direction and the scan optics move in the opposite direction at a suitable speed. The disclosure and claims are limited to the specific system disclosed and do not address problems in systems which, for example, have a stationary object or which have a lens movement separate from that of a scan lamp movement. In higher volume copiers, a preferred method of scanning has been to utilize a full-rate, half-rate mirror system which maintains proper object-to-lens distance during the course of travel. Such a scan system is relatively heavy, however, and the above-mentioned flyback inertial problems constitute an important limitation on the speed of the surface.

Precession onto a flat photoreceptor surface is also disclosed in U.S. Pat. No. 4,336,995 assigned to the same assignee as the present invention. In this patent an object is imaged onto a photoreceptor by an illumination scanning system which is moving at a faster rate than the photoreceptor.

Another variation of precessing an image onto a flat photoreceptor is disclosed in U.S. Pat. No. 4,372,670 assigned to the same assignee as the present invention. In this patent a fixed document lying in an object plane is scanned by a modified dual rate mirror system where the second (slower) mirror is moving at less than half the speed of the first (scan) mirror thereby causing a resultant decrease in platen-to-lens distance. This decrease is compensated for, and image precession obtained, by moving a projection lens and associated mirror along the optical axis in a direction opposed to that of the photoreceptor.

A still further variation of a system for precessing an image onto a flat photoreceptor is disclosed in U.S. Pat. No. 4,351,605 also assigned to the same assignee as the present invention. In this patent, a reproduction device is operated in two modes, one of which enables precession when multiple copies are made of the same document. In the precession mode, scanning is accomplished by moving the document past a stationary exposure zone and imparting movement to the other optical components to provide the required precession rates.

None of the above-disclosed precession systems have utilized an imaging system wherein a document to be copied is placed on a platen which is movable in conjunction with scanning optical components. According to the invention, a document platen, exposure slit, projection lens and a belt photoreceptor are displaced at predetermined velocities and distances so as to form a precessed image of the document on the photoreceptor surface. An advantage of this type of semi-moving platen system is that the optical components can be packaged into a more compact physical space than that required of conventional stationary platen, lens, and scanning mirror configurations. More particularly, the invention is directed to an optical scanning system for projecting light images of a document lying on a platen in an object plane along an optical path onto a flat portion of a photoreceptor moving through an image plane, said system comprising, means for moving said photoreceptor at a first rate of speed $V_4$, means for moving said platen in a direction opposite said photoreceptor motion and at a second speed $V_1$ less than said photorecetor speed, illumination means adapted to scan said document in a direction opposite said platen motion and at a third speed $V_2$ greater than said photoreceptor speed, and a scanning projection lens positioned along the optical path between said illumination means and said photoreceptor and moving at a fourth rate of speed $V_3$ less than said photoreceptor speed and in the same direction as said photoreceptor whereby said scanned image is projected through said lens and imaged, in precession fashion, onto said photoreceptor in a direction opposite to the direction of travel of said photoreceptor.

DRAWINGS

For a better understanding of the present invention, reference may be had to the accompanying drawings in which.

DESCRIPTION

Figure 1:
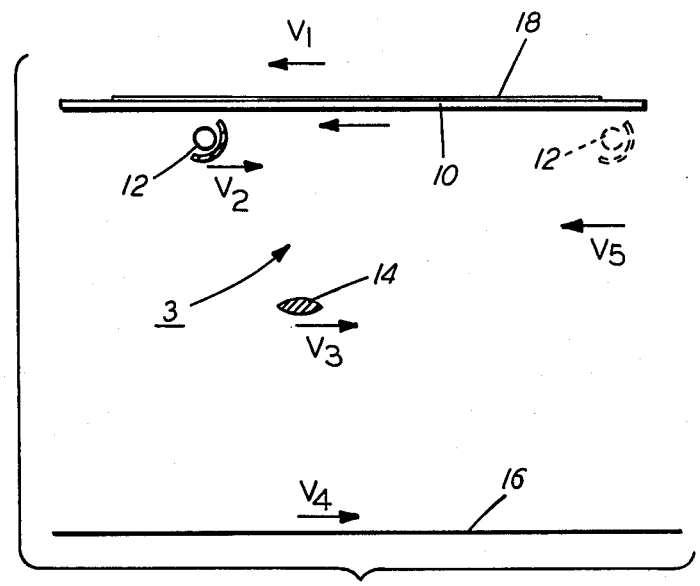
FIG. 1 shows a precession scan system utilizing a moving platen, moving illuminator, lens and photoreceptor, each of which have independent rates of movement.

Referring now to FIG. 1, there is shown an imaging system 8 comprising a movable platen 10, a scanning lamp/reflector assembly 12, lens 14 and photoreceptor belt 16. A document 18 to be copied is placed on platen 10. In operation, platen 10 is moved to the left at a first scan velocity $V_1$. The lamp/reflector assembly 12 moves from left to right at a second scan velocity $V_2$. The reflected light image is projected through lens 14, also moving from left to right at a third velocity $V_3$. The image is projected onto the surface of photoreceptor belt 16 moving at a fourth velocity $V_4$. At the end of the scan cycle, platen 10 and scan assembly 12 return to the start of scan positions at a fifth velocity $V_5$. As described in further detail below, the relationships between velocities $V_1$, $V_2$, $V_3$ and $V_4$ can be so ordered that an image is projected onto the belt at a rate faster than the belt travel rate and in a direction opposite to the belt movement; i.e. the image is precessed onto the belt. These relationships are further discussed in conjunction with FIG. 2 which has eliminated the platen of FIG. 1 for ease of explanation and simply defined the document size parallel to length of scan by points $P_1$, $P_2$. At the start of scan, assembly 12 and lens 14 are in the solid line position. A portion of belt 16 equivalent to the document length $P_1$, $P_2$ occupies a length defined by points AC with C being the image of object point $P_1$. At the end of the scan cycle, the platen has moved to the left, moving points $P_1$, $P_2$ to new positions $P'_1$, $P'_2$. Assembly 12 has moved from $A_1$ to the dotted line position $A_2$ illuminating point $P'_2$. Lens 14 has moved from position $L_1$ to the dotted line position $L_2$. Belt 16 has moved to position BD with object point $P'_2$ being imaged at point B. The combined motion of the platen 10 and illumination assembly 12 causes the illuminated image to back up (precess) along as it is laid down on the photoreceptor surface. The precession distance BC can be considered as the optical "window" through which imaging takes place. As platen 10 and assembly 12 return to the start of scan position, point B continues to move and can become imaging point C for the next start of scan.

The conditions for enabling the above precession imaging are set forth by the following equations:

The platen velocity is given by the expression:

$$V_1 = K_1 V_4 \tag{1}$$

where $K_1$ is a number greater than or equal to zero and less than or equal to 1, the specific value related to the amount of precession reqiored and the platen and lens displacements. The scan assembly velocity is given by:

$$V_2 = \frac{P_1 P_2}{ts} + K_1 V_4 \tag{2}$$

where ts is the scan time. The lens velocity is given by:

$$V_3 = \frac{1 - K_1}{2} V_4 \tag{3}$$

The time it takes to scan the distance $P_1 P_2$ is the scan time is given by the expression:

$$ts = \frac{P_1 P'_2}{V_4} = \frac{P_1 P_2}{V_1 + V_2} \tag{4}$$

The distance $P_1 P'_1$ traversed by platen 10 is given by the expression:

$$P_1 P'_1 = V_1 ts \tag{5}$$

The distance $A_1 A_2$ traversed by assembly 12 is given by:

$$A_1 A_2 = V_2 ts \tag{6}$$

The distance $L_1 L_2$ traversed by lens 14 is given by:

$$L_1 L_2 = V_3 ts \tag{7}$$

Belt 16 moves a distance AB (or CD) given by:

$$AB = V_4 ts \tag{8}$$

Photoreceptor distance AC is equal to system magnification (m) times document size or:

$$AC = m P_1 P_2 \tag{9}$$

Figure 2:
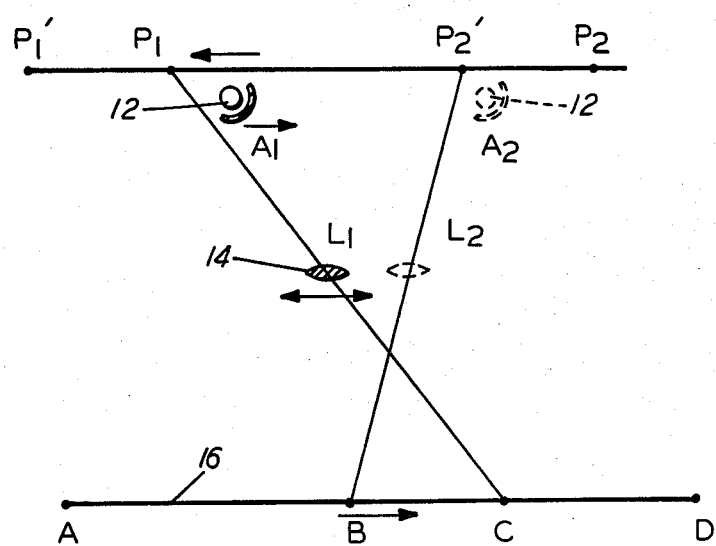
FIG. 2 is the diagram of FIG. 1 showing the precession of an object point onto the photoreceptor.

From FIG. 2, BC=AC−AB and therefore:

$$BC = m P_1 P_2 - V_4 ts \tag{10}$$

The condition for beginning the next scan with no interdocument gap (i.e. point B in FIG. 2 advancing to become the new start of scan object point C) is given by:

$$T_{FB(flyback\ time)} = \frac{BC}{V_4} = \frac{(m P_1 P_2 - V_4\ ts)}{V_4} \tag{11}$$

For some systems, some amount of interdocument gap may be necessary and desirable, e.g. to allow copy paper to be properly synchronized with the image on the photoreceptor. The precession rates can be set to allow for a longer flyback time to provide a desired "dead" space between images. This longer flyback time also has the desirable effect of reducing system accelerations and vibrations. As an example, Equation (11) is modified as shown in Equation (12) to provide a 5" interdocument gap.

$$T_{FB} = (m P_1 P_2 - T V_3 + 5'')/V_3 \tag{12}$$

For the system shown in FIG. 2, assume the following system values:
$P_1 P_2 = 10$ in.
$V_4 = 10.0$ ips K=0.5
ts=0.6 sec.
Then, from equation (1)

$$V_1 = 0.5(10 \text{ ips}) = 5.0 \text{ ips}$$

From equation (2)

$$V_2 = \frac{10 \text{ in}}{0.6 \text{ sec.}} - 0.5 (10 \text{ ips}) = 11.667 \text{ ips}$$

From equation (3)

$$V_3 = \frac{1 - 0.5}{2} \cdot 10 \text{ ips} = 2.5 \text{ ips}$$

From equation (5)

$$P_1P_1' = 5.0 \times 0.6 \text{ sec} = 3.0 \text{ inches}$$

From equation (6)

$$A_1A_2 = 11.667 \text{ ips} \times 0.6 \text{ sec} = 7.0 \text{ inches}$$

From equation (7)

$$L_1L_2 = 2.5 \text{ ips} \times 0.6 \text{ sec} = 1.5 \text{ inches}$$

From the above example, it can be seen that the platen and lens displacements are limited and the platen and lens velocities are fractions of the photoreceptor velocities. These small displacements enable a more compact scanning architecture to be designed for a given system.

In conclusion, it may be seen that there has been disclosed a novel optical imaging system. The exemplary embodiment described herein is presently preferred; however, it is contemplated that further variations and modifications within the purview of those skilled in the art can be made herein.

What is claimed is:

1. A scanning system for projecting light images of a document lying on a platen in an object plane along an optical path onto a flat portion of a photoreceptor moving through an image plane, said system comprising:
   means for moving said photoreceptor at a first rate of speed $V_4$,
   means for moving said platen in a direction opposite said photoreceptor motion and at a second speed $V_1$ which is less than said photoreceptor speed,
   illumination means adapted to scan said document in a direction opposite said platen motion and at a third speed $V_2$ greater than said photoreceptor speed, and
   a scanning projection lens positioned along the optical path between said illumination means and said photoreceptor and moving at a fourth rate of speed $V_3$ which is less than photoreceptor speed and in the same direction as said photoreceptor whereby said scanned image is projected through said lens and imaged, in precession fashion, onto said photoreceptor in a direction opposite to the direction of travel of said photoreceptor.

2. The scanning system of claim 1 wherein said platen, illumination means and lens motions are governed by the following relationships:

$$V_1 = KV_4$$

$$V_3 = \frac{1 - K}{2} V_4$$

$$V_2 = \frac{X}{t_s} + KV_4$$

where K is a number between 0 and 1 inclusive, X is the scan length of the document and $t_s$ is the scanning time.

* * * * *